(12) United States Patent
Mizusawa

(10) Patent No.: US 10,809,695 B2
(45) Date of Patent: Oct. 20, 2020

(54) INFORMATION PROCESSING APPARATUS, MACHINE LEARNING DEVICE AND SYSTEM

(71) Applicant: Fanuc Corporation, Minamitsuru-gun, Yamanashi (JP)

(72) Inventor: Kazuyasu Mizusawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 43 days.

(21) Appl. No.: 16/353,538

(22) Filed: Mar. 14, 2019

(65) Prior Publication Data

US 2019/0286100 A1 Sep. 19, 2019

(30) Foreign Application Priority Data

Mar. 19, 2018 (JP) ................................ 2018-051260
Jan. 30, 2019 (JP) ................................ 2019-013914

(51) Int. Cl.
*G05B 19/00* (2006.01)
*G05B 19/4063* (2006.01)
*G05B 19/408* (2006.01)
*H03M 11/00* (2006.01)

(52) U.S. Cl.
CPC ....... *G05B 19/4063* (2013.01); *G05B 19/408* (2013.01); *G05B 2219/31249* (2013.01); *G05B 2219/33253* (2013.01); *G05B 2219/34491* (2013.01)

(58) Field of Classification Search
None
See application file for complete search history.

(56) References Cited

U.S. PATENT DOCUMENTS

| 5,349,646 | A | * | 9/1994 | Furuta | G05B 13/027 706/23 |
| 5,790,558 | A | | 8/1998 | Nakamura | |
| 2017/0032283 | A1 | * | 2/2017 | Kamiya | G01M 13/00 |
| 2017/0185056 | A1 | * | 6/2017 | Satou | G05B 13/027 |
| 2019/0047143 | A1 | * | 2/2019 | Matsudaira | B25J 9/1676 |

(Continued)

FOREIGN PATENT DOCUMENTS

| EP | 0887719 A1 | 12/1998 |
| JP | 8-320713 A | 12/1996 |
| JP | 10-187234 A | 7/1998 |

OTHER PUBLICATIONS

A. L'Heureux, K. Grolinger, H. F. Elyannany and M. A. M. Capretz, "Machine Learning With Big Data: Challenges and Approaches," in IEEE Access, vol. 5, pp. 7776-7797, 2017 (Year: 2017).*

*Primary Examiner* — Daniel F. McMahon
(74) *Attorney, Agent, or Firm* — RatnerPrestia

(57) ABSTRACT

There is provided an information processing apparatus capable of identifying the cause of a data transfer error.
The information processing apparatus for identifying a cause of occurrence of a data transfer error in data communication with a device includes: an error detection unit that detects occurrence of a data transfer error; a recording unit that records the number of detections of the data transfer error per a unit time; and an identification unit that identifies, on the basis of a trend in the number of detections of the data transfer error per the unit time, whether the cause of occurrence of the data transfer error is influence of noise or a hardware fault.

10 Claims, 11 Drawing Sheets

(56) References Cited

U.S. PATENT DOCUMENTS

2019/0129398 A1\* 5/2019 Naito ................... G06K 9/6262
2019/0235481 A1\* 8/2019 Takigawa ............. G05B 23/024
2019/0286100 A1\* 9/2019 Mizusawa .......... G05B 19/4063
2020/0081757 A1\* 3/2020 Ota ....................... G06F 11/079

\* cited by examiner

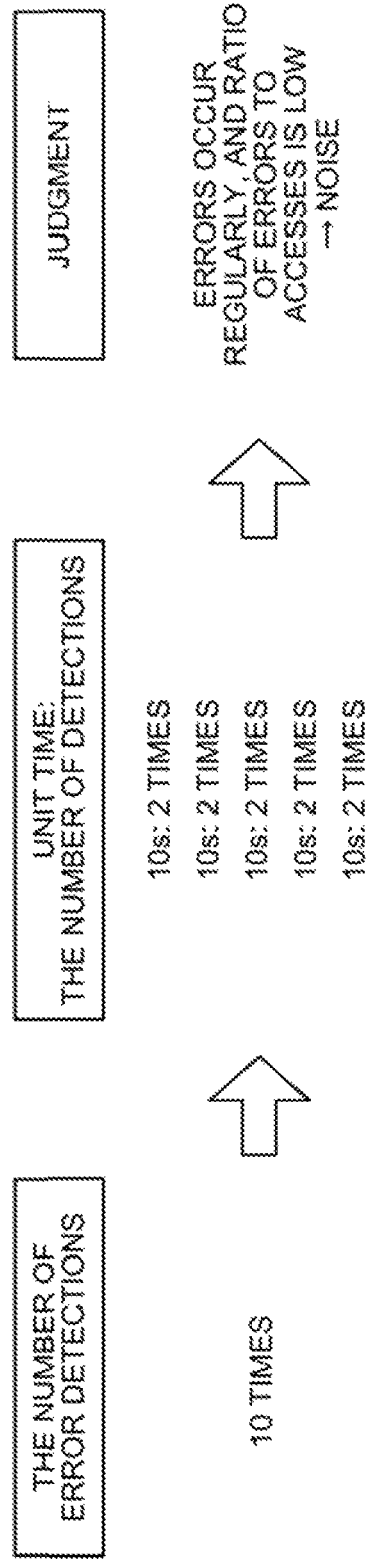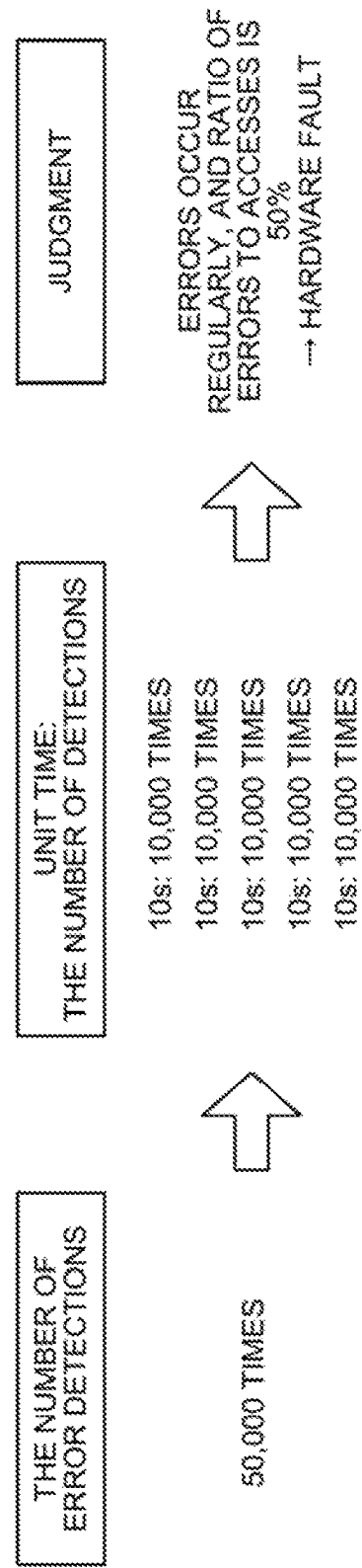

INFORMATION PROCESSING APPARATUS, MACHINE LEARNING DEVICE AND SYSTEM

RELATED APPLICATIONS

The present application claims priority to Japanese Patent Application Number 2018-051260 filed Mar. 19, 2018 and Japanese Patent Application Number 2019-013914 filed Jan. 30, 2019, the disclosure of which are hereby incorporated by reference herein in their entirety.

BACKGROUND OF THE INVENTION

1. Field of the Invention

The present invention relates to an information processing apparatus, a machine learning device and a system and, more particularly, to an information processing apparatus, a machine learning device and a system capable of identifying the cause of a data transfer error.

2. Description of the Related Art

In data communication between devices (including communication in a printed circuit board used in an electrical instrument or the like, communication between information processing apparatuses connected over a communication network, communication of a numerical controller with an external unit, such as a servo drive device or an I/O instrument, and the like), data may fail to be normally transferred due to various factors. Examples of means for detecting such a data transfer error include parity and an error correction code (ECC).

Either method can detect a data transfer error and record the number of detections. However, the method can not analyze the cause of occurrence of a data transfer error.

Japanese Patent Application Laid-Open No. 08-320713 discloses a numerical controller which visualizes the status of occurrence of a retry, error correction, or the like to facilitate seeking of the cause of a communication failure due to exogenous noise. Japanese Patent Application Laid-Open No. 10-187234 discloses a control device which displays on a screen, for example, the state of the control device in the event of a communication error to facilitate identification of the cause of occurrence of the communication error.

In a circuit with stable operation, an unexpected malfunction is unlikely to occur. However, an abnormality of some kind may occur in transferred data, and a value different from an expected value may be received by the circuit. The cause of this abnormality is generally the influence of noise or a hardware fault. To take measures against a data transfer error, it is necessary to identify whether the cause of occurrence of a data transfer error is the influence of noise or a hardware fault. The methods disclosed in Japanese Patent Application Laid-Open No. 08-320713 and Japanese Patent Application Laid-Open No. 10-187234, however, are incapable of identifying whether the cause of occurrence of a data transfer error is the influence of noise or a hardware fault.

In order to solve the above-described problem, an information processing apparatus, a machine learning device and a system capable of identifying the cause of a data transfer error are required.

SUMMARY OF THE INVENTION

An information processing apparatus according to an embodiment of the present invention is an information processing apparatus for identifying a cause of occurrence of a data transfer error in data communication with a device. The information processing apparatus includes: an error detection unit that detects occurrence of the data transfer error; a recording unit that records the number of detections of the data transfer error per a unit time; and an identification unit that identifies, on the basis of a trend in the number of detections of the data transfer error per the unit time, whether the cause of occurrence of the data transfer error is influence of noise or a hardware fault.

A machine learning device according to an embodiment of the present invention is a machine learning device for learning a cause of occurrence of a data transfer error corresponding to the number of detections of the data transfer error per unit time in data communication with a device, the machine learning device comprising: a state observation unit that observes the number of detections of the data transfer error per the unit time as a state variable representing a current state of an environment; a judgment data acquisition unit that acquires judgment data indicating the cause of occurrence of the data transfer error; and a learning unit that learns by associating the number of detections of the data transfer error per the unit time and the cause of occurrence of the data transfer error using the state variable and the judgment data.

A system according to an embodiment of the present invention is a system having a plurality of apparatuses interconnected over a network, wherein the plurality of apparatuses include at least the information processing apparatus having a machine learning device.

The present invention can provide an information processing apparatus capable of identifying the cause of a data transfer error.

BRIEF DESCRIPTION OF THE DRAWINGS

The above and other objects and features of the present invention will become more apparent from the following description of exemplary embodiments with reference to the accompanying drawings, in which:

FIG. 4A is a chart showing an example of operation of the information processing apparatus according to the second embodiment;

FIG. 4B is a chart showing an example of the operation of the information processing apparatus according to the second embodiment;

DETAILED DESCRIPTION OF THE PREFERRED EMBODIMENTS

A configuration of an information processing apparatus 1 according to an embodiment of the present invention will be described.

Figure 1:
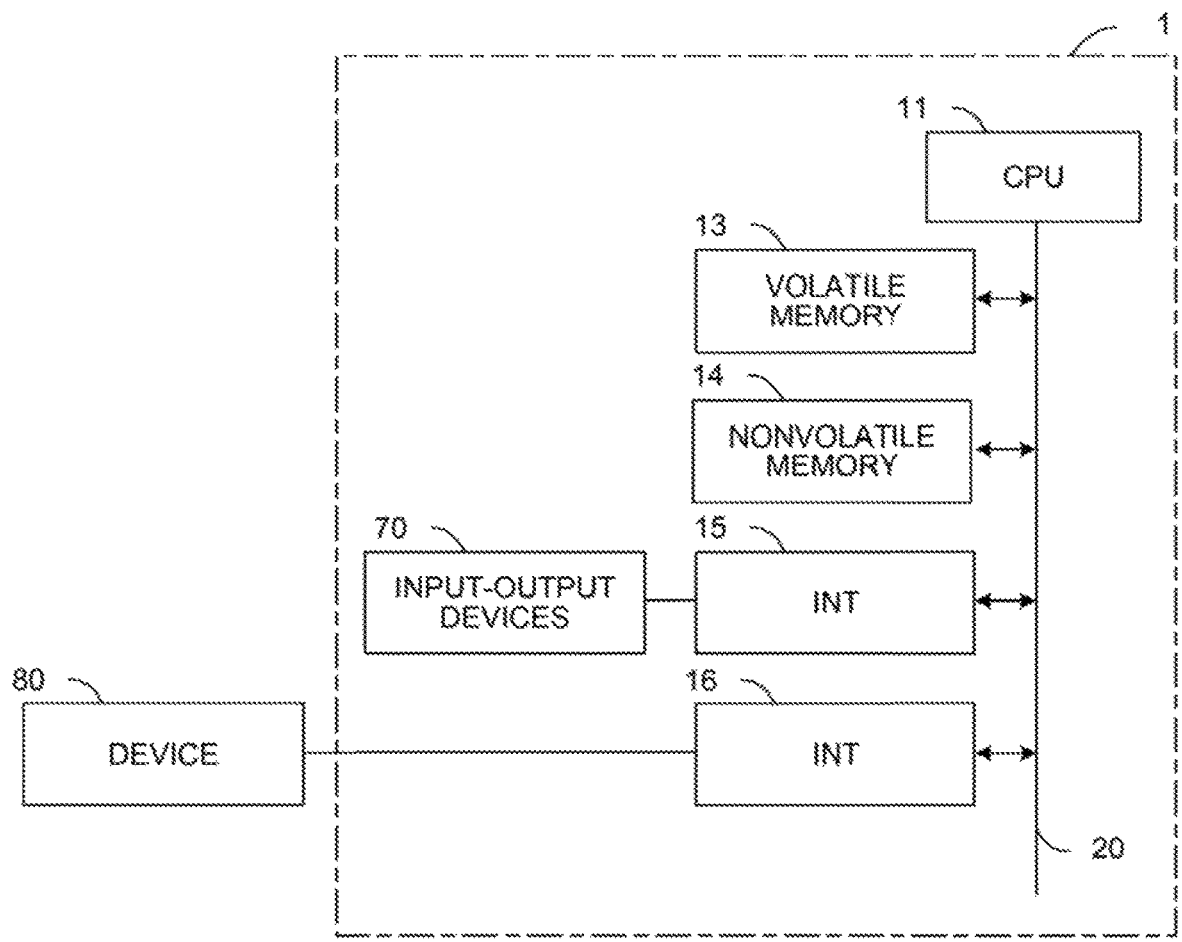
FIG. 1 is a hardware configuration diagram of an information processing apparatus.

FIG. 1 is a schematic hardware configuration diagram showing principal portions of the information processing apparatus 1 according to the embodiment of the present invention.

Typical examples of the information processing apparatus 1 include a server computer, a personal computer, a microcomputer, and a control device (for example, a numerical controller) for a robot, a machine tool, or the like. The information processing apparatus 1 includes a Central Processing Unit (CPU) 11, a volatile memory 13, a nonvolatile memory 14, an interface 15, an interface 16, a bus 20, and input-output devices 70. One or more devices 80 are connected to the information processing apparatus 1.

The CPU 11 is a processor which performs overall control of the information processing apparatus 1. The CPU 11 reads out a system program which is stored in the nonvolatile memory 14 and controls the whole of the information processing apparatus 1 in accordance with the system program.

The volatile memory 13 temporarily stores temporal calculation data, display data, and the like.

The nonvolatile memory 14 is backed up by, for example, a battery (not shown), and the storage state thereof is held even when the power to the information processing apparatus 1 is turned off. The nonvolatile memory 14 stores therein the system program, an application program, data which is input from the input-output devices 70, data which is received from the device(s) 80, and the like. The programs and data stored in the nonvolatile memory 14 may be loaded into the volatile memory 13 at the time of execution and use.

The input-output devices 70 are, for example, a display device, such as a display, and a data input device, such as a keyboard. The input-output devices 70 display, on the display, information which is received from the CPU 11 via the interface 15. The input-output devices 70 pass data which is input through the keyboard or the like to the CPU 11 via the interface 15.

Each device 80 is an external device which performs data communication with the information processing apparatus 1 and is, for example, an external unit, such as another information processing apparatus, a servo drive device, or an I/O instrument. The device 80 transmits and receives data to and from the CPU 11 via the interface 16.

Figure 2:
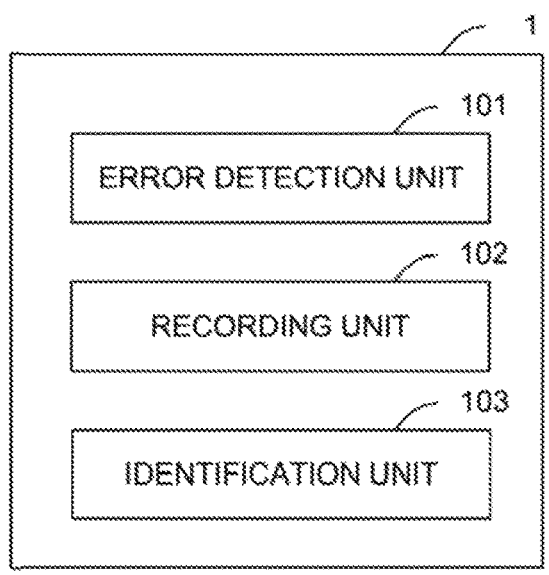
FIG. 2 is a block diagram showing a functional configuration of each of information processing apparatuses according to first and second embodiments.

FIG. 2 is a block diagram showing a schematic functional configuration of the information processing apparatus 1 according to the embodiment of the present invention. The information processing apparatus 1 is typically realized as one function of a piece of software running on a computer. The information processing apparatus 1 includes an error detection unit 101, a recording unit 102, and an identification unit 103.

The error detection unit 101 detects a data transfer error generated in communication between the information processing apparatus 1 and the device 80. The error detection unit 101 can typically detect occurrence of a data transfer error by detecting an error in communication data using, for example, parity or an error correction code (ECC) as described above.

The recording unit 102 records and accumulates the number of data transfer errors per unit time which is detected by the error detection unit 101. For example, the recording unit 102 counts the number of detections of data transfer errors and saves a cumulative total every 10 seconds. The recording unit 102 may record times of detection of data transfer errors one by one and obtain the number of error detections per unit time by later batch processing or the like. The unit time may be arbitrarily set in accordance with, for example, a value which is input to the input-output devices 70 by a user.

Preferably, the recording unit 102 records and accumulates the number of communications (the number of accesses) between the information processing apparatus 1 and the device 80 per unit time. This can be implemented, for example, when a function of a numerical controller counts the number of data transfers via the bus 20 or the interface 16.

The identification unit 103 identifies the cause of occurrence of a data transfer error by referring to the recording unit 102 and analyzing a trend in the number of error detections per unit time. That is, the identification unit 103 identifies the cause of occurrence of a data transfer error by analyzing, for example, the progression of or variation in the number of errors detected per unit time which is recorded in the recording unit 102. A specific identification method will be described in the embodiments below.

First Embodiment

A method for identifying the cause of occurrence of a data transfer error will be described as a first embodiment with a focus on variation in the number of times a data transfer error is detected.

The inventor has discovered that there is variation in the number of data transfer errors or data transfer errors tend to occur in a concentrated manner at a certain time if a data transfer error occurs due to the influence of noise. The inventor has also discovered that a data transfer error tends to occur periodically to some extent or with regularity if a data transfer error occurs due to a hardware fault. If a data transfer error occurs due to a hardware fault, a fixed number of data transfer errors are typically observed in series per unit time.

Figure 3A:
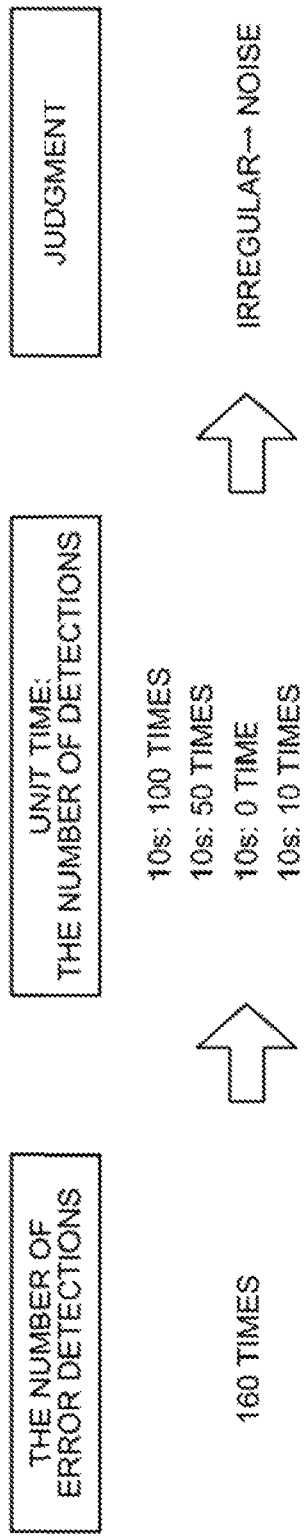
FIG. 3A is a chart showing an example of operation of the information processing apparatus according to the first embodiment.
Figure 3B:
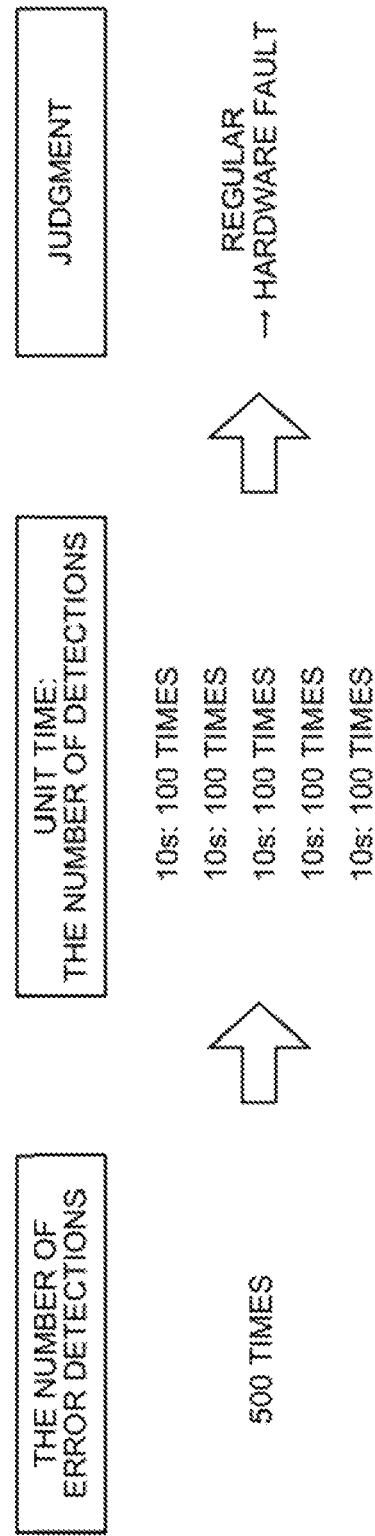
FIG. 3B is a chart showing an example of the operation of the information processing apparatus according to the first embodiment.

FIGS. 3A and 3B are charts showing examples of operation of the information processing apparatus 1 according to the first embodiment. FIG. 3A shows an example of a case where the error detection unit 101 has detected 160 errors within a predetermined period (50 seconds). In the recording unit 102, the 160 data transfer errors are divided into groups for respective unit times (10 seconds) and recorded. That is, there is a history of occurrences of 100 data transfer errors, 50 data transfer errors, 0 data transfer errors, 10 data transfer errors, and 0 data transfer errors per 10 seconds in chronological order. In this case, since the frequency of occurrence (the number of occurrences per unit time) of a data transfer error has no regularity, the identification unit 103 judges that the cause of occurrence of a data transfer error is the influence of noise.

FIG. 3B shows an example of a case where the error detection unit 101 has detected 500 errors within a predetermined period (50 seconds). In the recording unit 102, the 500 data transfer errors are divided into groups for respective unit times (10 seconds) and recorded. That is, there is a history of occurrences of 100 data transfer errors, 100 data transfer errors, 100 data transfer errors, 100 data transfer errors, and 100 data transfer errors per 10 seconds in chronological order. Since there is a history of occurrence of a fixed number of data transfer errors during certain period of time (100 times per 10 seconds), the frequency of occurrence of data transfer errors (the number of occurrences per unit time) can be said to have regularity. In this case, the identification unit 103 judges that the cause of occurrence of a data transfer error is a hardware fault.

The identification unit 103 judges that a data transfer error is occurring regularly, for example, if the number of occurrences of a data transfer error per unit time falls within a fixed range. For example, if the number of occurrences of a data transfer error per unit time (10 seconds) remains over a predetermined period (50 seconds) to fall within the range of 80 or more to 120 or less, the identification unit 103 judges that a data transfer error is occurring regularly. For example, if the variance of the number of occurrences of a data transfer error per unit time is not more than a predetermined threshold, the identification unit 103 judges that a data transfer error is occurring regularly. The identification unit 103 judges that a data transfer error is occurring irregularly if the variance of the number of occurrences of a data transfer error per unit time is larger than the predetermined threshold.

An upper limit and a lower limit of the range for the number of occurrences of a data transfer error per unit time, the threshold of the variance, and the like which are used in the judgment by the identification unit 103 may be set in accordance with, for example, values input to the input-output devices 70 by a user.

According to the first embodiment, the cause of occurrence of a data transfer error can be easily identified.

Second Embodiment

A method for identifying the cause of occurrence of a data transfer error with higher accuracy will be described as a second embodiment with a focus on the ratio of the number of detections of data transfer errors to the number of accesses.

The inventor has discovered that the ratio of the number of detections of data transfer errors per unit time to the number of accesses per unit time tends to be not less than a fixed ratio if a data transfer error occurs due to a hardware fault. Examples of general hardware faults include an earth fault, a short circuit, and a buffer fault. Assuming that a certain data line is fixed to "0" due to such a fault when data patterns are random on average, data transfer errors, the number of which is about 50% of the number of accesses, occur theoretically. Empirically, there is a high possibility that a fault is occurring in a piece of hardware if the ratio of the number of detections of data transfer errors to the number of accesses exceeds 30%. On the other hand, if a data transfer error occurs due to the influence of noise, there is a low correlation between the number of accesses and the number of detections of data transfer errors.

FIGS. 4A and 4B are charts showing examples of operation of an information processing apparatus 1 according to the second embodiment. In this example, the number of accesses per unit time (10 seconds) is assumed to have always been 20,000. FIG. 4A shows an example of a case where an error detection unit 101 has detected 10 errors within a predetermined period (50 seconds). The data transfer errors detected within the predetermined period (50 seconds) are divided into groups for respective unit times (10 seconds) and recorded in a recording unit 102. That is, there is a history of occurrences of two data transfer errors, two data transfer errors, two data transfer errors, two data transfer errors, and two data transfer errors per 10 seconds in chronological order. In this case, since the frequency of occurrence of a data transfer error has regularity, the information processing apparatus 1 described in the first embodiment judges that the cause of occurrence of a data transfer error is a hardware fault. In the information processing apparatus 1 according to the second embodiment, however, an identification unit 103 further calculates the ratio of the number of detections of data transfer errors to the number of accesses. In the example shown in FIG. 4A, the ratio of the number of detections of data transfer errors per unit time to the number of accesses per unit time is 1/10,000 and is not more than a threshold (set to 30/100) determined in advance. Thus, the identification unit 103 judges that the cause of occurrence of a data transfer error is not a hardware fault but the influence of noise.

FIG. 4B shows an example of a case where the error detection unit 101 has detected 50,000 errors within the predetermined period (50 seconds). In the recording unit 102, the 50,000 data transfer errors are divided into groups for respective unit times (10 seconds) and recorded. That is, there is a history of occurrences of 10,000 data transfer errors, 10,000 data transfer errors, 10,000 data transfer errors, 10,000 data transfer errors, and 10,000 data transfer errors per 10 seconds in chronological order. In this case, since the frequency of occurrence of a data transfer error has regularity, the information processing apparatus 1 described in the first embodiment judges that the cause of occurrence of a data transfer error is a hardware fault. In the information processing apparatus 1 according to the second embodiment, the identification unit 103 further calculates the ratio of the number of detections of data transfer errors to the number of accesses. In the example shown in FIG. 4B, the ratio of the number of detections of data transfer errors per unit time to the number of accesses per unit time is ½ and is larger than the threshold (set to 30/100) determined in advance. Thus, the identification unit 103 judges that the cause of occurrence of a data transfer error is a hardware fault.

As described above, if a data transfer error is occurring regularly, and the ratio of the number of detections of data transfer errors per unit time to the number of accesses per unit time is, for example, not less than the predetermined threshold, the identification unit 103 judges that the cause of occurrence of a data transfer error is a hardware fault. For example, if a data transfer error is occurring regularly, and the ratio exceeds 30% during the predetermined period, the identification unit 103 judges that the cause of occurrence of a data transfer error is a hardware fault.

The threshold for the ratio of the number of detections of data transfer errors per unit time to the number of accesses per unit time that is used in the judgment by the identification unit 103 may be set in accordance with, for example, a value input to input-output devices 70 by a user.

According to the second embodiment, the cause of occurrence of a data transfer error can be identified with higher accuracy.

Third Embodiment

A method for presenting a clue for seeking the cause of occurrence of noise to a user if the cause of occurrence of a data transfer error is the influence of the noise will be described as a third embodiment.

Figure 5:
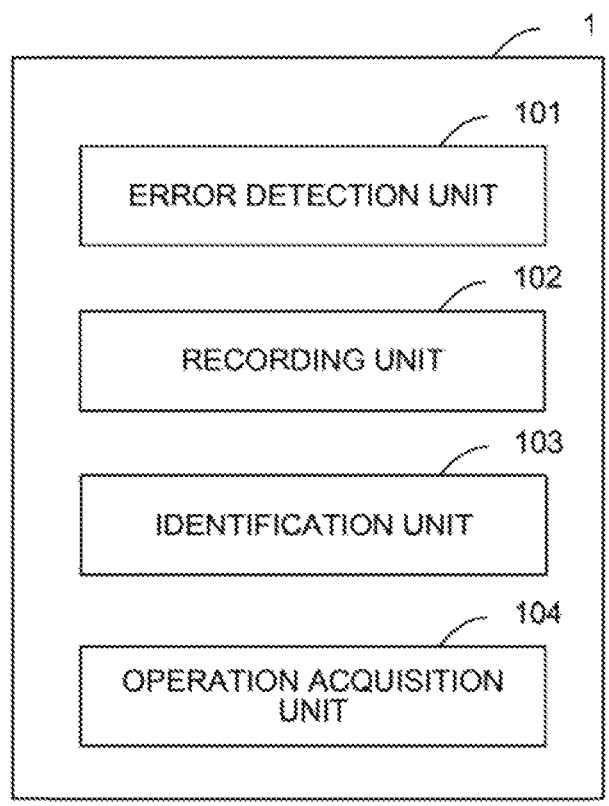
FIG. 5 is a block diagram showing a functional configuration of an information processing apparatus according to a third embodiment.

As shown in FIG. 5, an information processing apparatus 1 according to the third embodiment includes, as an additional component, an operation acquisition unit 104. The operation acquisition unit 104 preferably acquires an operating status at each point of a device 80 and the information processing apparatus 1 with a period equal to a unit time as described above. For example, if the information processing apparatus 1 is a numeral controller, the information processing apparatus 1 can acquire the ON/OFF status of an external instrument, that is, the device 80 via an I/O interface, through which an external signal is taken in. Similarly, the information processing apparatus 1 can acquire, for example, the drive status of a motor.

A recording unit 102 records and accumulates an operating status acquired with the period by the operation acquisition unit 104. Preferably, the recording unit 102 acquires an operating status and the number of detections of data transfer errors as described above and records the operating status and the number of detections together with a time of detection. Note that a signal propagation delay may be taken into consideration at the time of recording of the operating status of the device 80 in the recording unit 102. For example, a delay time is set in accordance with a value input to input-output devices 70 by the user. The recording unit 102 records a time which is earlier by the delay time than a time of actual acquisition of the operating status as a time of occurrence of the operating status.

Figure 6:
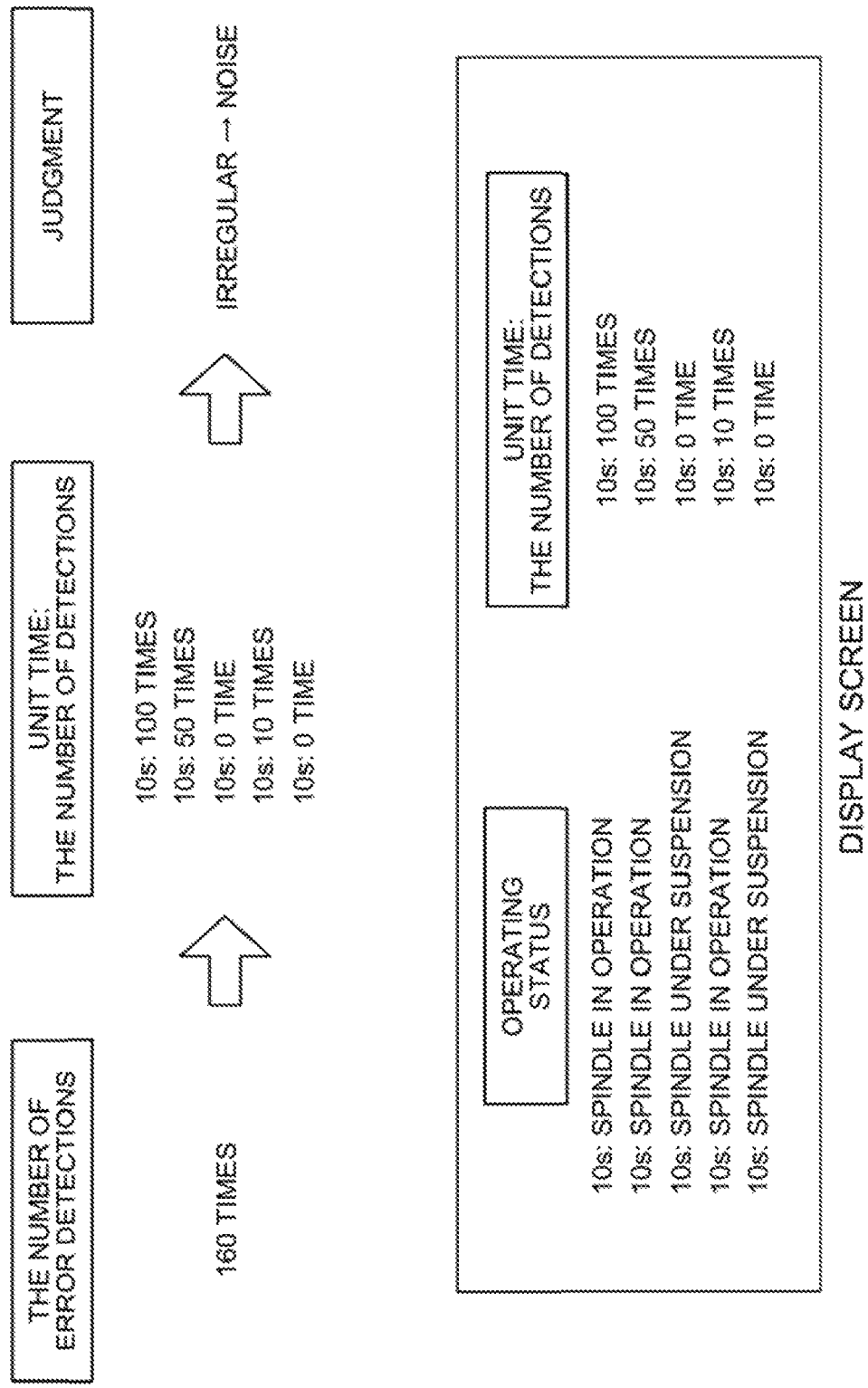
FIG. 6 is a chart showing an example of operation of the information processing apparatus according to the third embodiment.
Figure 7:
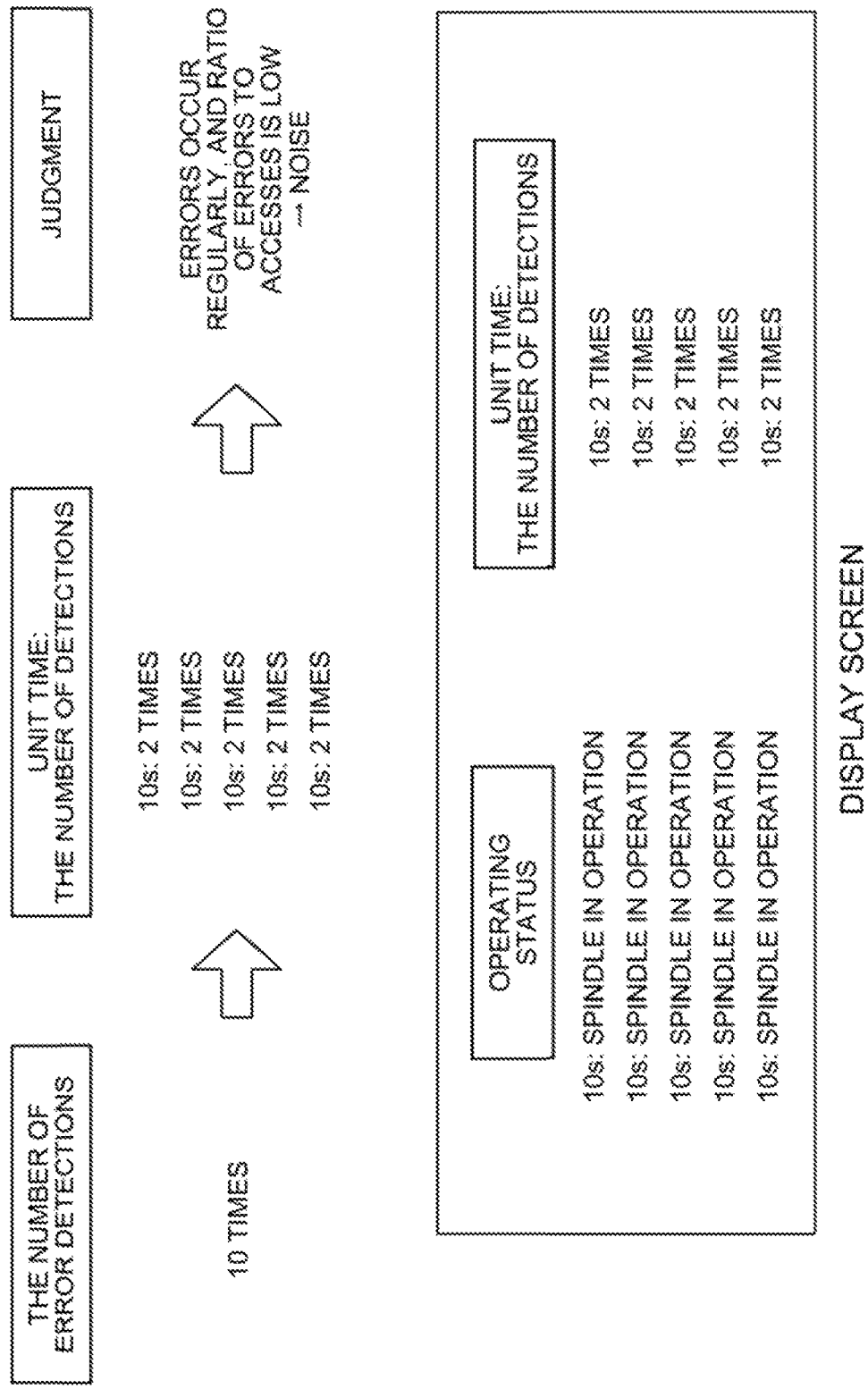
FIG. 7 is a chart showing an example of the operation of the information processing apparatus according to the third embodiment.

If an identification unit 103 judges that the cause of occurrence of a data transfer error is the influence of noise, the identification unit 103 presents an operating status at or near a time of detection of data transfer errors to the user. As shown in FIGS. 6 and 7, the identification unit 103 causes a display of the input-output devices 70 to display a list of the numbers of detections of data transfer errors per unit time side-by-side with operating statuses acquired at almost the same times as the detection of the data transfer errors, for example. Note that FIG. 6 shows a display example in a case where the cause of occurrence of a data transfer error is judged to be the influence of noise in the information processing apparatus 1 described in the first embodiment. FIG. 7 shows a display example in a case where the cause of occurrence of a data transfer error is judged to be the influence of noise in the information processing apparatus 1 described in the second embodiment.

If acquisition of an operating status at almost the same time as detection of data transfer errors occurs a plurality of times, the identification unit 103 can highlight the operating statuses. This makes it possible to properly present an operating status which has a high probability of being the cause of occurrence of noise to the user.

According to the third embodiment, a clue for seeking the cause of occurrence of noise can be presented to the user.

Fourth Embodiment

A method for learning and identifying the cause of occurrence of a data transfer error through machine learning will be described as a fourth embodiment.

Figure 8:
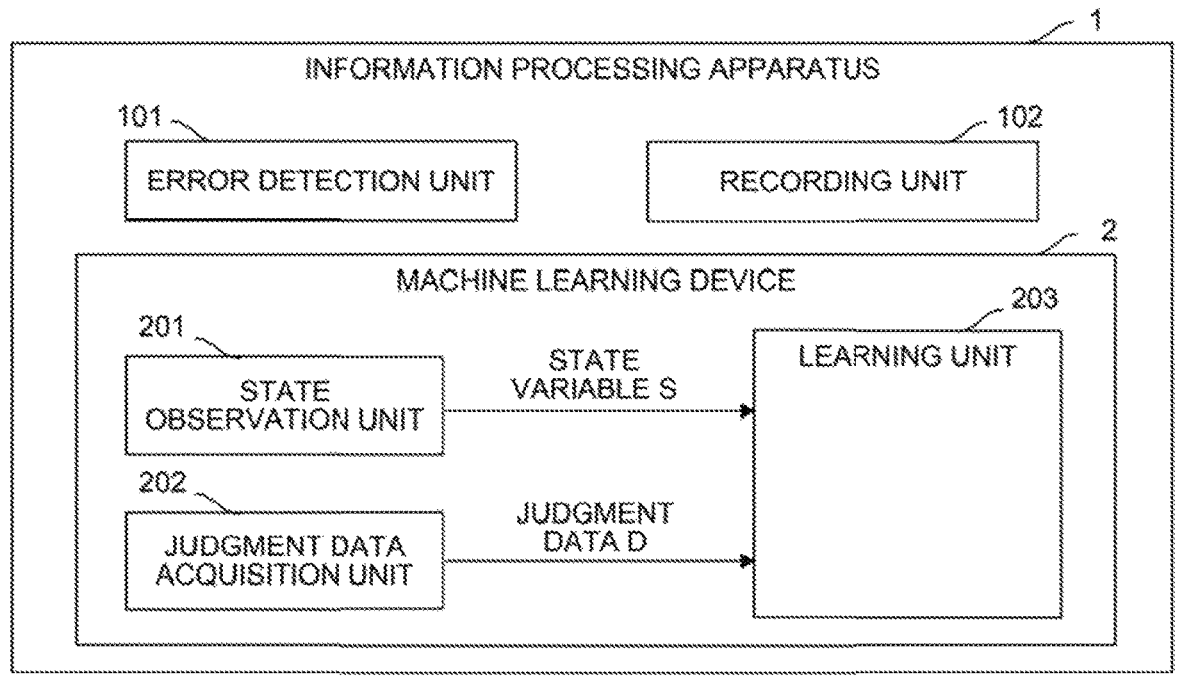
FIG. 8 is a block diagram showing a functional configuration of an information processing apparatus according to a fourth embodiment.

FIG. 8 is a schematic functional block diagram of an information processing apparatus 1 according to the fourth embodiment. The information processing apparatus 1 includes a machine learning device 2 which performs self-learning of a correlative relationship between the number of detections of data transfer errors and the cause of occurrence of a data transfer error through machine learning, in addition to an error detection unit 101 and a recording unit 102. The machine learning device 2 substitutes for the identification unit 103 according to each of the first to third embodiments.

As indicated by functional blocks in FIG. 8, the machine learning device 2 of the information processing apparatus 1 includes a state observation unit 201, a judgment data acquisition unit 202, and a learning unit 203.

The state observation unit 201 observes, as a state variable S representing a current state of an environment, a data set indicating the numbers of detections of data transfer errors per unit time that are detected over a predetermined period. The judgment data acquisition unit 202 acquires judgment data D indicating the cause of occurrence of a data transfer error. The learning unit 203 learns a correlative relationship between the state variable S and the judgment data D.

Pieces of data saved in the recording unit 102 can be used as the state variable S observed by the state observation unit 201, that is, a data set indicating the number of detections of data transfer errors per unit time. For example, a data set obtained by putting together a predetermined number of the numbers of detections of data transfer errors per unit time in chronological order can be adopted as the state variable S. More specifically, a data set of "100, 50, 0, 10, 0" obtained by dividing 160 errors detected during 50 seconds into groups for respective unit times (10 seconds) and arranging the groups in chronological order can be adopted as the state variable S.

For example, information indicating the cause of occurrence of a data transfer error that is identified by an experienced engineer seeking the cause at the time of occurrence of data transfer errors indicated by the state variable S (the data set of "100, 50, 0, 10, 0") can be used as the judgment data D acquired by the judgment data acquisition unit 202, that is, information indicating the cause of occurrence of a data transfer error. For example, the judgment data D is "1" if the cause of occurrence of a data transfer error is the influence of noise and is "2" if the cause of occurrence is a hardware fault.

The learning unit 203 learns a correlative relationship between a data set indicating the number of detection of data transfer errors per unit time and the cause of occurrence of a data transfer error in accordance with an arbitrary learning algorithm generically called machine learning. The learning unit 203 repeatedly executes learning based on a data collection including a large number of data sets, each having the state variable S and the judgment data D. By repeating such a learning cycle, the learning unit 203 can automatically identify features which imply a correlative relationship between a data set indicating the number of detections of data transfer errors per unit time and the cause of occurrence of a data transfer error. At the start of the learning algorithm, a correlative relationship between a data set indicating the number of detections of data transfer errors per unit time and the cause of occurrence of a data transfer error is substantially unknown; however, the learning unit 203 gradually identifies such features and derives correlation with the progress of learning. When a correlative relationship between a data set indicating the number of detections of data transfer errors per unit time and the cause of occurrence of a data transfer error reaches a level which is reliable to some extent, a learning result which is repeatedly output by the learning unit 203 can be used to make a behavioral choice (that is, make a decision) as to how to judge the cause of occurrence of a data transfer error for the current state (that is, a data set indicating the number of detections of data transfer errors per unit time). That is, the learning unit 203 can gradually bring a correlative relationship between a data set indicating the number of detections of data transfer errors per unit time and the cause of occurrence of a data transfer error closer to an optimum solution with the progress of the learning algorithm.

The state variable S is composed of pieces of data which are unlikely to be affected by disturbance, and the judgment data D is uniquely determined by data input by a user. Thus, the machine learning device 2 can automatically and accurately obtain the cause of occurrence of a data transfer error corresponding to a data set indicating the number of detections of data transfer errors per unit time without making an estimate, by using a learning result from the learning unit 203. For this reason, the cause of occurrence of a data transfer error can be quickly determined by just acquiring a data set indicating the number of detections of data transfer errors per unit data. It is thus possible to shorten the time required to seek the cause of occurrence of a data transfer error.

As a modification of the machine learning device 2, the learning unit 203 can perform learning using the state variable S and the judgment data D obtained from a different information processing apparatus 1 having the same configuration. Since this configuration allows an increase in the quantity of data collections, each having the state variable S and the judgment data D obtained in a fixed time, it is possible to improve the speed and reliability of learning using more diverse data collections as inputs.

Figure 9:
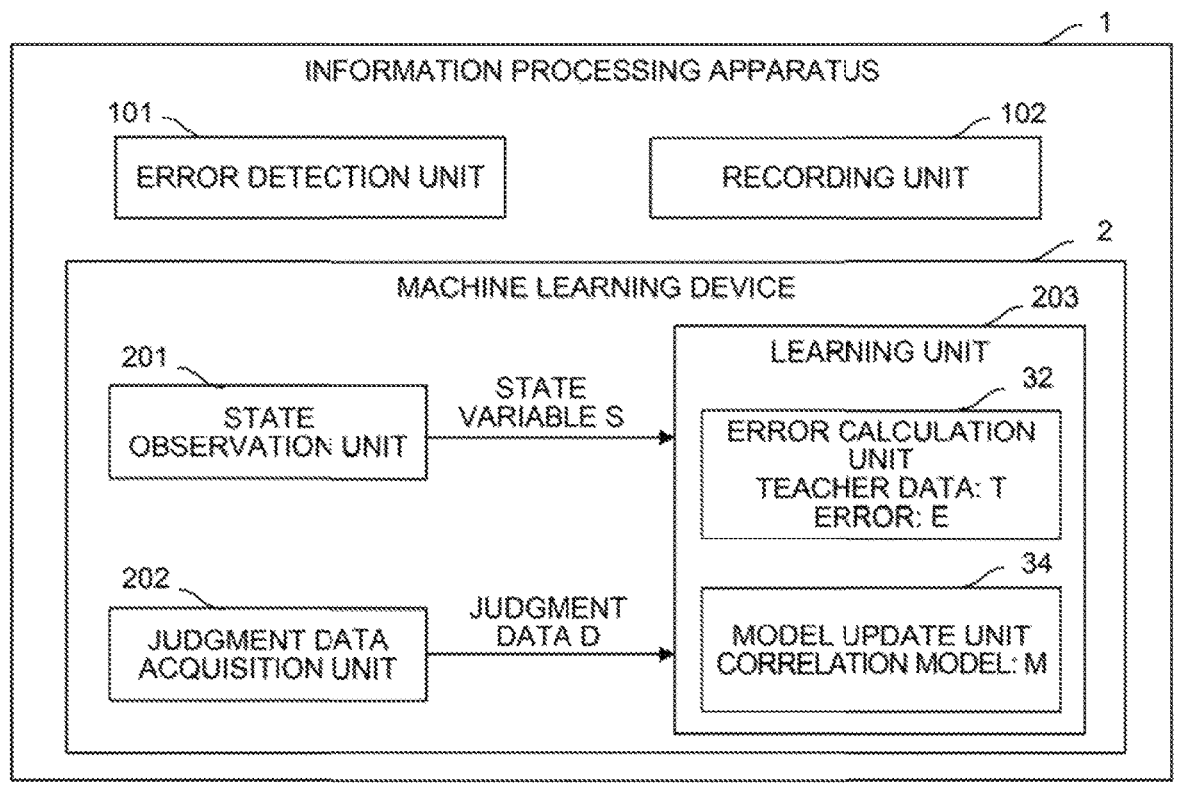
FIG. 9 is a block diagram showing a functional configuration of the information processing apparatus according to the fourth embodiment.

In the machine learning device 2, the learning algorithm that is executed by the learning unit 203 is not limited to a particular learning algorithm, and a publicly known learning algorithm can be adopted as machine learning. FIG. 9 shows a form of the information processing apparatus 1 shown in FIG. 8 and a configuration including the learning unit 203 that executes supervised learning as the learning algorithm. Supervised learning is a technique for learning a correlation model for estimating an output for a new input by being provided with a large quantity of known data sets of inputs and corresponding outputs (referred to as teacher data) in advance and identifying features which imply a correlation between an input and an output from the teacher data.

In the machine learning device 2 shown in FIG. 9, the learning unit 203 includes an error calculation unit 32 and a model update unit 34. The error calculation unit 32 calculates an error E between a correlation model M for deriving the cause of occurrence of a data transfer error corresponding to a data set indicating the number of detections of data transfer errors per unit time from the state variable S and the judgment data D and a correlation feature which is identified from teacher data T prepared in advance. The model update unit 34 updates the correlation model M so as to reduce the error E. The learning unit 203 learns the cause of occurrence of a data transfer error corresponding to a data set indicating the number of detections of data transfer errors per unit time by the model update unit 34 repeating update of the correlation model M.

An initial value of the correlation model M is, for example, a simplified expression (for example, as a linear function) of a correlative relationship between a data set indicating the number of detections of data transfer errors per unit time and the cause of occurrence of a data transfer error and is provided for the learning unit 203 before the start of supervised learning. The teacher data T can be constructed with, for example, empirical values (known data sets including data sets of the numbers of detections of data transfer errors per unit time and the causes of occurrence of data transfer errors) accumulated through the work of seeking the cause of a past data transfer error by an experienced engineer and is provided for the learning unit 203 before the start of supervised learning. The error calculation unit 32 identifies a correlation feature which implies a correlative relationship between a data set indicating the number of detections of data transfer errors per unit time and the cause of occurrence of a data transfer error from a large quantity of teacher data T provided for the learning unit 203 and obtains the error E between the correlation feature and the correlation model M corresponding to the state variable S and the judgment data D in the current state. The model update unit 34 updates the correlation model M so as to reduce the error E in accordance with, for example, a predetermined update rule.

In this manner, a previously unknown correlation between the current state of the environment and a behavior corresponding thereto gradually becomes clear. That is, a correlative relationship between a data set indicating the number of detections of data transfer errors per unit time and the cause of occurrence of a data transfer error is gradually brought closer to an optimum solution.

Figure 10A:
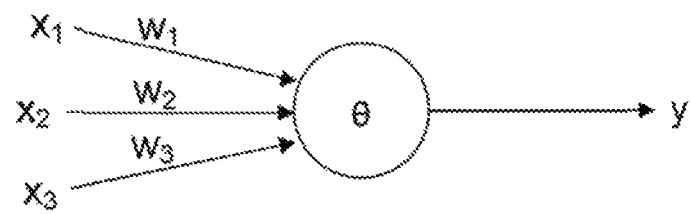
FIG. 10A is a diagram schematically showing a model of a neuron.
Figure 10B:
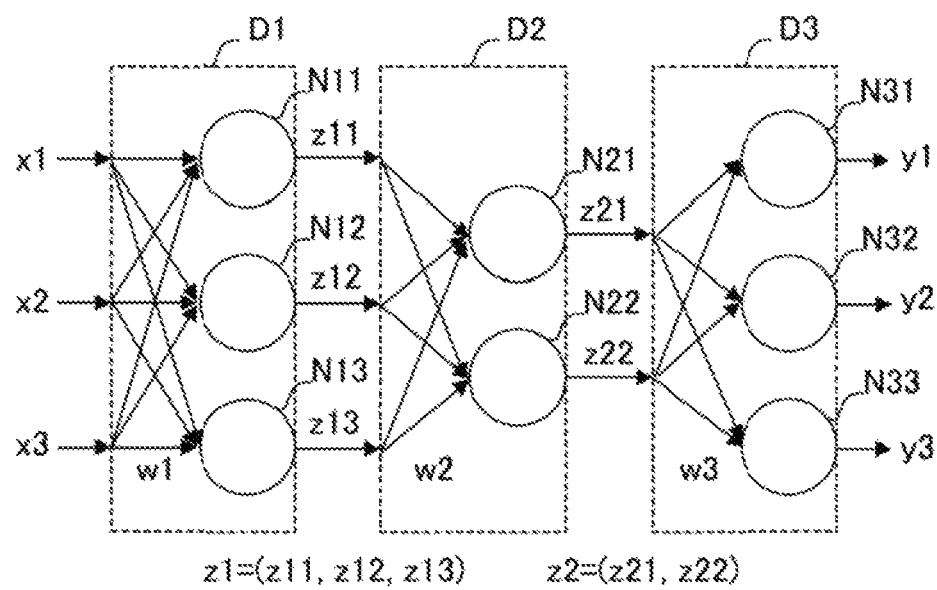
FIG. 10B is a diagram schematically showing a model of a neural network.

When the supervised learning is advanced, a neural network can be used. FIG. 10A schematically shows a model of a neuron. FIG. 10B schematically shows a model of a three-layer neural network configured by combining the neurons shown in FIG. 10A. The neural network can be configured by, for example, a calculation device, storage, or the like which imitates the model of the neuron.

The neuron shown in FIG. 10A outputs a result y to a plurality of inputs x (here, for example, inputs $x_1$ to $x_3$). The inputs $x_1$ to $x_3$ are multiplied by weights w ($w_1$ to $w_3$) corresponding to these inputs x. As a result, the neuron outputs the output y expressed by Formula 1 given below. In Formula 1, each of the input x, the output y, and the weight w is vector. Moreover, $\theta$ represents a bias and $f_k$ represents an activating function.

$$y = f_k(\Sigma_{i=1}^{n} x_i w_i - \theta) \qquad (1)$$

A plurality of inputs x (here, for example, inputs x1 to x3) are input to the three-layer neural network shown in FIG. 10B from the left side thereof, and results y (here, for example, results y1 to y3) are output from the right side thereof. In an example shown in FIG. 10B, each of the inputs x1, x2, and x3 is multiplied by a corresponding weight (generically expressed as w1) and each of the inputs x1, x2, and x3 is input to three neurons N11, N12, and N13.

The outputs of the neurons N11 to N13 are generically expressed as z1 in FIG. 10B. z1 can be regarded as a feature vector which is the extracted feature amount of an input vector. In the example shown in FIG. 10B, each of the feature vectors z1 is multiplied by a corresponding weight (generically expressed as w2), and each of the feature vectors z1 is input to two neurons N21 and N22. The feature vector z1 indicates a feature between the weight w1 and the weight w2.

The outputs of the neurons N21 and N22 are generically expressed as z2 in FIG. 10B. z2 can be regarded as a feature vector which is the extracted feature amount of the feature vector z1. In the example shown in FIG. 10B, each of the feature vectors z2 is multiplied by a corresponding weight (generically expressed as w3), and each of the feature vectors z2 is input to three neurons N31, N32, and N33. The feature vector z2 indicates a feature between the weight w2 and the weight w3. Finally, the neurons N31 to N33 respectively output the results y1 to y3.

The machine learning device 2 can output the cause of occurrence (the result y) of a data transfer error corresponding to a data set indicating the number of detections of data transfer errors per unit time as a result of performing computation in a multi-layer structure in accordance with the above-described neural network using the state variable S and the judgment data D as the inputs x by the learning unit 203. Note that operation modes of the neural network include a learning mode and a value prediction mode. For example, the weight w can be learned using a learning data set in the learning mode, and the value of an action can be judged using the learned weight w in the value prediction mode. Note that detection, classification, inference, and the like can also be performed in the value prediction mode.

The above-described configuration of the information processing apparatus 1 can be described as a machine learning method (or a piece of software) which is executed by a CPU of a computer. This machine learning method is a machine learning method for learning the cause of occurrence of a data transfer error corresponding to a data set indicating the number of detections of data transfer errors per unit time and includes: a step in which the CPU of the computer observes a data set indicating the number of detections of data transfer errors per unit time as the state variable S representing the current state of the environment; a step in which the CPU acquires the judgment data D indicating the cause of occurrence of a data transfer error; and a step in which the CPU learns by associating the data set indicating the number of detections of data transfer errors per unit time with the cause of occurrence of a data transfer error using the state variable S and the judgment data D.

According to the fourth embodiment, various thresholds and the like which are appropriately set on the basis of, for example, experience of engineers in the first to third embodiments need not be set. Further, the cause of occurrence of a data transfer error corresponding to a data set indicating the number of detections of data transfer errors per unit time can be automatically and accurately output without making an estimate and the like. Additionally, according to the fourth embodiment, a correlative relationship between a data set indicating the number of detections of data transfer errors per unit time and the cause of occurrence of a data transfer error that is not yet identified can be modeled through machine learning. This can allow higher-accuracy judgment.

An already-trained model (hereinafter referred to as a trained model) obtained as a result of learning by the learning unit 203 of the machine learning device 2 is used as a program module which is a part of a piece of software associated with machine learning. A trained model according to one aspect of the present invention is used in a computer including a processor, such as a CPU or a Graphics Processing Unit (GPU), and a memory. More specifically, the processor of the computer performs computation using, as an input, a data set indicating the number of detections of data transfer errors per unit time in accordance with an instruction from the trained model stored in the memory and outputs a result of estimating the cause of occurrence of a data transfer error on the basis of a result of the computation. The trained model according to the one aspect of the present invention may be, for example, copied from an external storage medium to a different computer or copied to the different computer via a network or the like and used in the different computer.

When the trained model according to the one aspect of the present invention is copied to the different computer and used in a new environment, the trained model may perform further learning on the basis of a new state variable and new judgment data obtained in the environment. In this case, a new trained model (hereinafter referred to as a derived model) derived from the trained model that has performed learning in a different environment can be obtained in the new environment. The derived model according to the one aspect of the present invention is the same as the original trained model in outputting a result of estimating the cause of occurrence of a data transfer error from a data set indicating the number of detections of data transfer errors per unit time. The derived model, however, is different from the original trained model in outputting a result more adapted to the new environment than the original trained model. The derived model can also be copied from an external storage medium to a different computer or copied to the different computer via a network or the like and used in the different computer.

Further, a trained model (hereinafter referred to as a distilled model) obtained by performing learning in a different machine learning device using an input to a machine learning device incorporating the trained model according to the one aspect of the present invention and an output obtained as a result of the input may be created (such a learning process is called distillation). In the distillation, the original trained model is also called a teacher model, and the newly created distilled model is also called a student model. Generally, a distilled model is smaller in model size than an original trained model and calculates an output with the same level of accuracy as the original trained model. The distilled model is thus suitable for distribution to a different computer using an external storage medium, a network, or the like.

Figure 11:
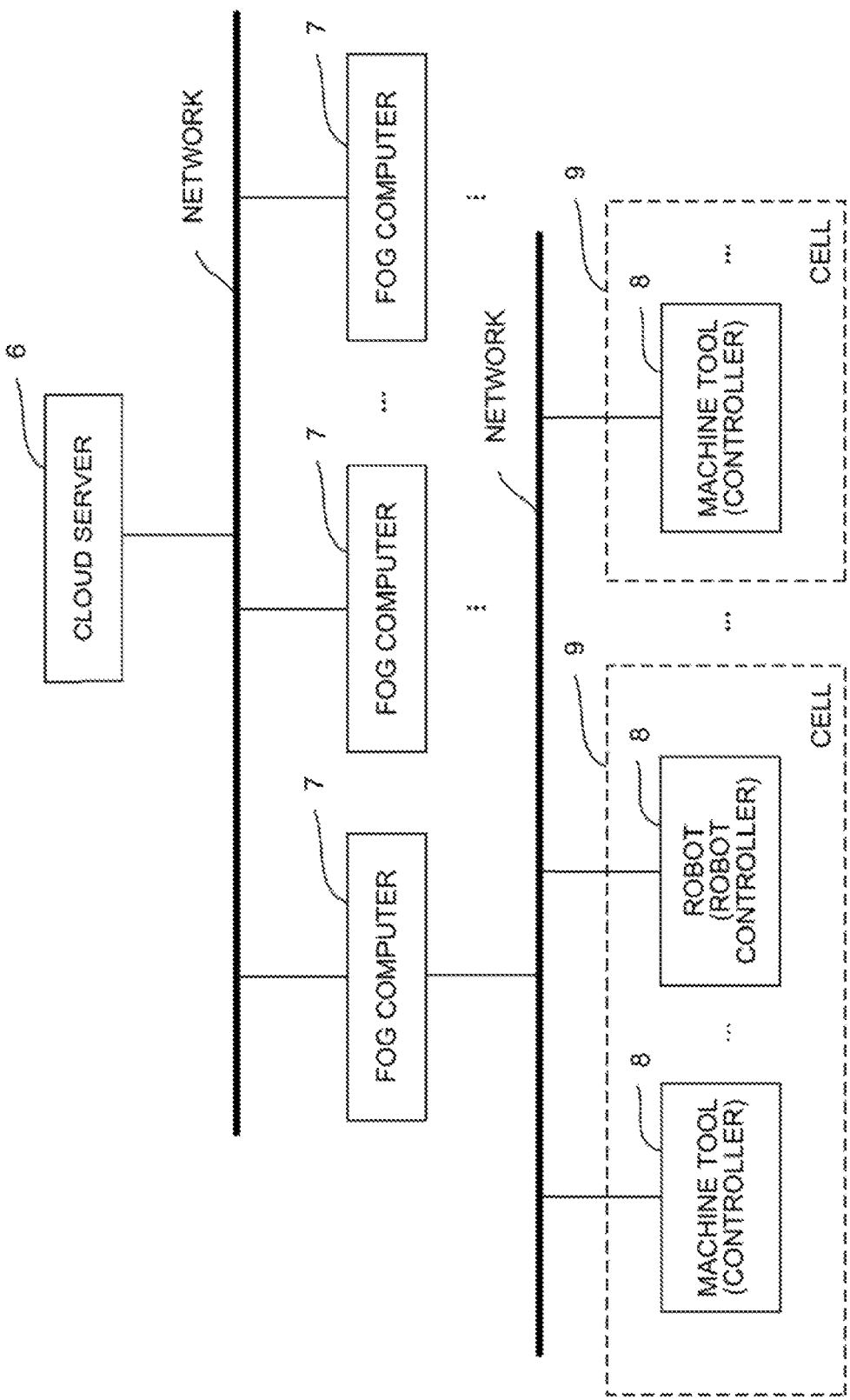
FIG. 11 is a diagram showing a system of hierarchical structure of three layers including a cloud server, a fog computer and an edge computer.

The fifth to seventh embodiments below will describe embodiments of a system in which the information processing apparatus 1 according to the fourth embodiment and a plurality of apparatuses including a cloud server, a host computer, a fog computer, and an edge computer (for example, a robot controller or a control apparatus) are interconnected over a wired/wireless network. As illustrated in FIG. 11, a system described in each of the fifth to seventh embodiments below has a plurality of apparatuses which are connected to each other over a network and is logically divided into and is composed of three layers, a layer including a cloud server 6 and the like, a layer including fog computers 7 and the like, and a layer including edge computers 8 (for example, a robot controller and a control apparatus included in cells 9) and the like. In this system, an information processing apparatus 1 according to one aspect of the present invention can be mounted in any of the cloud server 6, the fog computer 7, and the edge computer 8. The information processing apparatus 1 can share data used in processing associated with machine learning with each of the plurality of apparatuses over the network and perform distributed learning. The information processing apparatus 1 can collect generated trained models into the fog computer 7 or the cloud server 6 for large-scale analysis. Additionally, the information processing apparatus 1 can share a generated trained model with the different information processing apparatuses 1 for mutual use. In the system illustrated in FIG. 11, a plurality of cells 9 are provided in a plant in each place. Further, the fog computer 7 at a higher layer manages the respective cells 9 in predetermined units (for example, by plant or by a plurality of plants belonging to the same manufacturer). Pieces of data collected and analyzed by the fog computer 7 are collected by the cloud server 6 at an even higher layer and are subjected to analysis and the like. Information obtained as a result of the analysis is used for control and the like in each edge computer 8.

Fifth Embodiment

A system with an information processing apparatus 1 according to the fifth embodiment will be described below.

Figure 12:
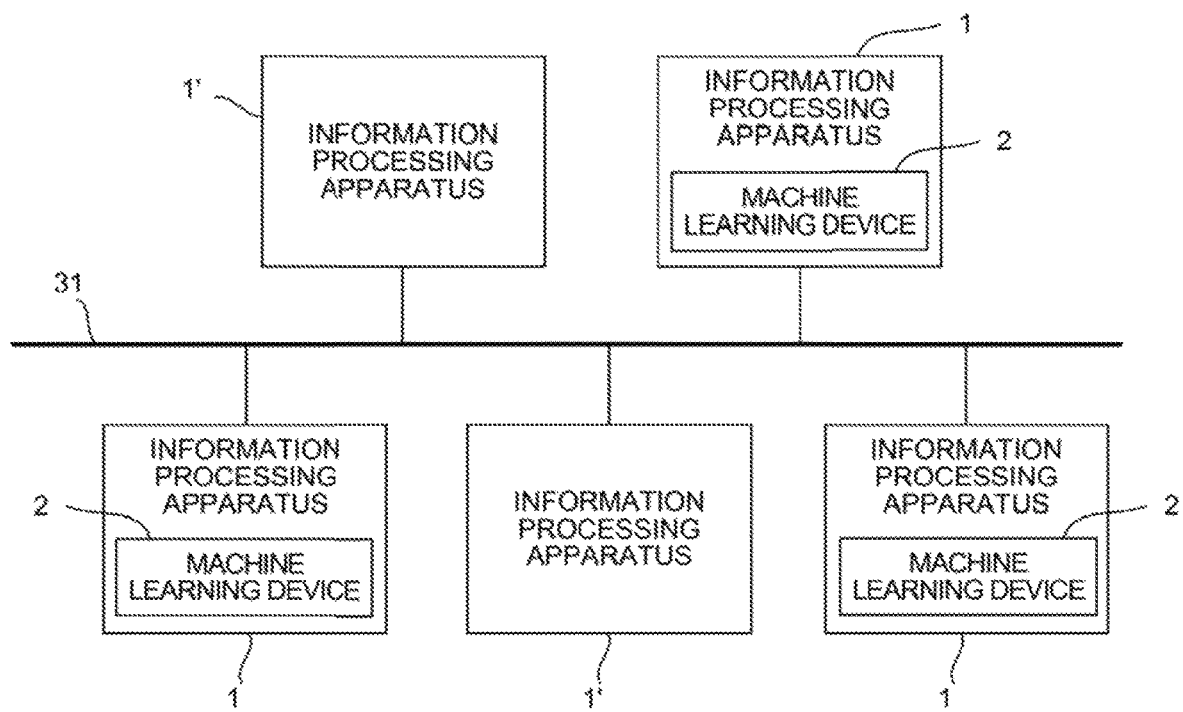
FIG. 12 is a functional block diagram schematically showing an embodiment of a system to which information processing apparatuses are incorporated.

FIG. 12 is a schematic configuration diagram of a system 3 including the information processing apparatus 1 according to the fifth embodiment. The system 3 includes a plurality of information processing apparatuses 1 and 1' and a network 31 which connects the information processing apparatuses 1 and 1' to one another. Each information processing apparatus 1 includes the machine learning device 2. In contrast, each information processing apparatus 1' does not include the machine learning device 2. The information processing apparatus 1 having the machine learning device 2 may be mounted in a computer such as a cloud server, a host computer, a fog computer.

In the system 3, each information processing apparatus 1 including the machine learning device 2 among the plurality of information processing apparatuses 1 and 1' can automatically and accurately obtain the cause of occurrence of a data transfer error corresponding to a data set indicating the number of detections of data transfer errors per unit time without making an estimate and the like, by using a learning result from the learning unit 203. Further, at least one information processing apparatus 1 can learns the cause of occurrence of a data transfer error which is common to all information processing apparatuses 1 and 1' and which corresponds to a data set indicating the number of detections of data transfer errors per unit time on the basis of the state variable S and the judgment data D obtained for each of the other information processing apparatuses 1 and 1'. According to this, all the information processing apparatuses 1 and 1' share a learning result. Thus, according to the system 3, the speed and reliability of learning can be improved using more diverse data collections (including the state variable S and the judgment data D) as inputs.

A system in which a machine learning device 2 and an information processing apparatus 1 are mounted on different devices will be described as the sixth embodiment.

Figure 13:
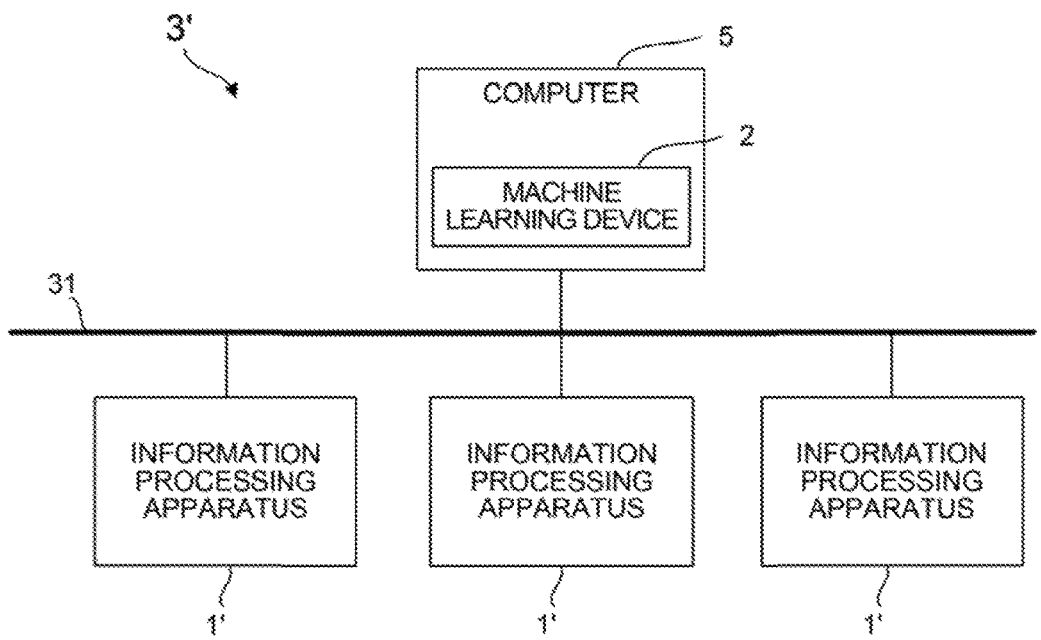
FIG. 13 is a functional block diagram schematically showing another embodiment of a system to which information processing apparatuses are incorporated.

FIG. 13 is a schematic configuration diagram of a system according to the fifth embodiment in which a machine learning device 2 and an information processing apparatus 1 are mounted in different devices. The system 3' includes at least one machine learning device 2 mounted as a part of a computer 5 such as a cloud server, host computer and a fog computer, a plurality of information processing apparatuses 1', and the network 31 that connects the information processing apparatuses 1' and the machine learning device 2 to one another. In addition, hardware configuration of the computer 5 is the same as the hardware configuration of the information processing apparatus 1 schematically described in FIG. 1. That is, a hardware of the computer 5 is configured by connecting the devices such as a CPU 11, a volatile memory 13 and a nonvolatile memory 14 and the like provided in a general computer to one another via a bus 20.

In the system 3' with the above-described configuration, the machine learning device 2 learns the cause of occurrence of a data transfer error which is common to all the information processing apparatuses 1' and which corresponds to a data set indicating the number of detections of data transfer errors per unit time on the basis of the state variable S and the judgment data D obtained for each of the plurality of information processing apparatuses 1'. In addition, the system 3' can automatically and accurately obtain the cause of occurrence of a data transfer error without making an estimate and the like, by using a learning result. According to the configuration of the system 3', the required number of information processing apparatus 1' is connected to the machine learning device 2 when required.

Seventh Embodiment

A system including a machine learning device 2' and an information processing apparatus 1 will be described as a seventh embodiment.

Figure 14:
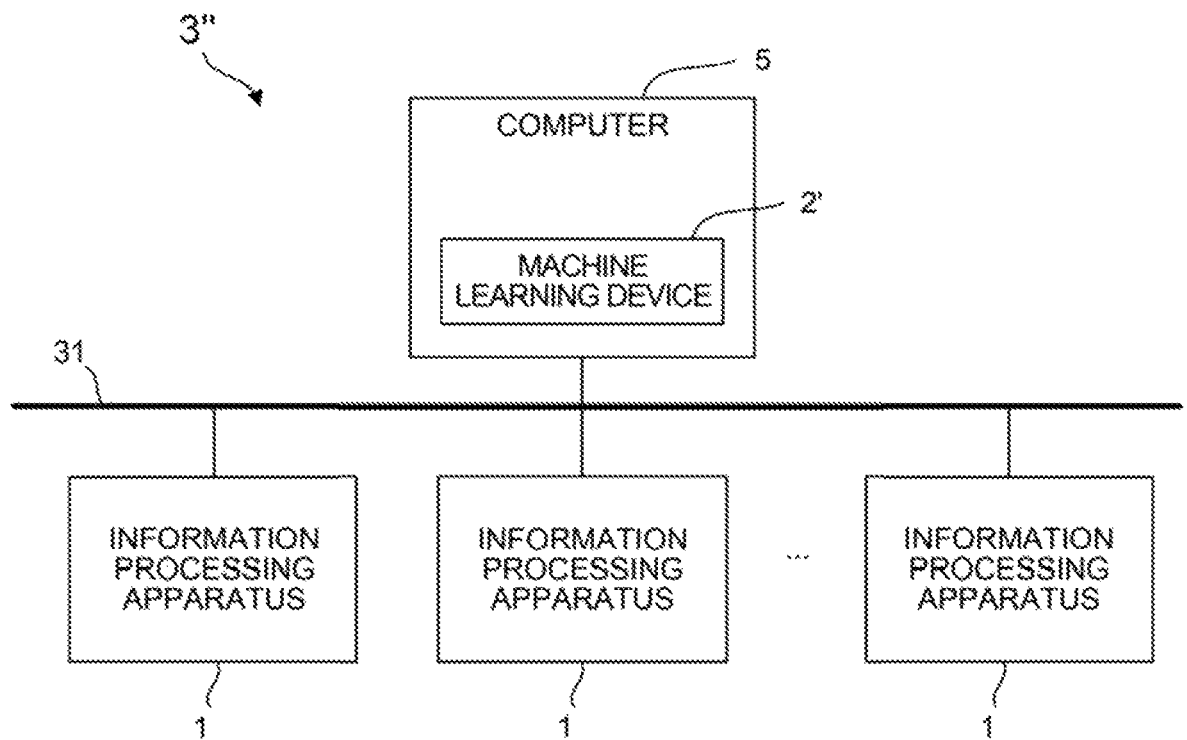
FIG. 14 is a functional block diagram schematically showing the other embodiment of a system to which information processing apparatuses are incorporated.

FIG. 14 is a schematic configuration diagram of a system 3" according to the seventh embodiment which includes the machine learning device 2' and the information processing apparatus 1. The system 3" includes at least one machine learning device 2' which is mounted in a computer 5, such as an edge computer, a fog computer, a host computer, or a cloud server, a plurality of information processing apparatuses 1, and a wired/wireless network 31 which connects the information processing apparatuses 1 and the computer 5 to each other.

In the system 3" with the above-described configuration, the computer 5 including the machine learning device 2' acquires, from each information processing apparatus 1, a trained model which is obtained as a result of machine learning by a machine learning device 2 provided in the information processing apparatus 1. The machine learning device 2' provided in the computer 5 performs knowledge optimization and streamlining processing based on the plurality of trained models, thereby newly generating a trained model and distributing the generated trained model to each information processing apparatus 1.

Examples of optimization or streamlining of a trained model to be performed by the machine learning device 2' include generating a distilled model on the basis of a plurality of trained models acquired from the information processing apparatuses 1. In this case, the machine learning device 2' according to the present embodiment performs learning using pieces of input data input to the trained models acquired from the information processing apparatuses 1 and pieces of output data obtained as a result of inputting the pieces of input data to the trained models. With this learning, the machine learning device 2' newly generates the trained model (distilled model). The distilled model thus generated is distributed to the information processing apparatuses 1 and different computers over an external storage medium or the network 31 and used in the information processing apparatuses 1 and the different computers, as described above.

As another example of optimization or streamlining of a trained model to be performed by the machine learning device 2', the example below can be given. The machine learning device 2' analyzes a distribution of pieces of output data from each trained model obtained in response to input of pieces of input data by a general statistical method in a process of performing distillation of the plurality of trained models acquired from the information processing apparatuses 1. With this analysis, the machine learning device 2' extracts outliers among combinations, each having a piece of input data and a piece of output data, and performs distillation using combinations, each having a piece of input data and a piece of output data, with the outliers excluded. Through the process, the machine learning device 2' excludes a combination indicating an exceptional value from combinations, each having a piece of input data and a piece of output data, obtained from each trained model and generates a distilled model using combinations, each having a piece of input data and a piece of output data, with combinations indicating exceptional values excluded. The distilled model thus generated is used as a trained model more general-purpose than the trained models generated by the plurality of information processing apparatuses 1.

Note that the machine learning device 2' may optimize or streamline a trained model (for example, analyze each trained model and optimize hyperparameters for the trained model on the basis of a result of the analysis) using a different general method.

The system 3" according to the present embodiment may be configured in the manner below. That is, for example, the machine learning device 2' is arranged in the computer 5 as a fog computer which is provided for the plurality of information processing apparatuses 1 as edge computers. Trained models generated by the information processing apparatuses 1 are aggregated and stored in the fog computer. The plurality of trained models stored in the fog computer are subjected to optimization or streamlining processing, and the optimized or streamlined trained models are redistributed to the information processing apparatuses 1, as needed.

In the system 3" according to the present embodiment, for example, trained models aggregated and stored in the computer 5 as the fog computer or trained models optimized or streamlined by the fog computer may be collected into a superordinate host computer or cloud server. In this case, for example, the trained models are available for application to an intellectual task in a plant or a manufacturer of the information processing apparatuses 1 (for example, application to construction of a more general-purpose trained model in a superordinate server and redistribution of the trained model, assistance for a maintenance task based on a result of analyzing a trained model, analysis of performance and the like of each information processing apparatus 1, or development of a new machine).

According to the present invention, the cause of a data transfer error can be quickly identified. Measures against a data transfer error vary greatly depending on the cause. Early identification of a cause is very important in terms of down-time shortening and early recovery.

Note that the present invention is not limited to the embodiments described above and can be carried out in various modes by being changed as appropriate.

The invention claimed in:

1. An information processing apparatus for identifying a cause of occurrence of a data transfer error in data communication with a device, the information processing apparatus comprising:
   an error detection unit that detects occurrence of the data transfer error;
   a recording unit that records the number of detections of the data transfer error per a unit time; and
   an identification unit that identifies, on the basis of a trend in the number of detections of the data transfer error per the unit time, whether the cause of occurrence of the data transfer error is influence of noise or a hardware fault.

2. The information processing apparatus according to claim 1, wherein
   the identification unit judges that the cause of occurrence of the data transfer error is a hardware fault if the number of detections of the data transfer error per the unit time are regular.

3. The information processing apparatus according to claim 1, wherein
   the identification unit judges that the cause of occurrence of the data transfer error is a hardware fault if the number of detections of the data transfer error per the unit time are regular, and a ratio of the number of detections of the data transfer error per the unit time to the number of accesses to the device per the unit time exceeds a predetermined threshold.

4. The information processing apparatus according to claim 1, further comprising:
   an operation acquisition unit that acquires an operating status of the device, wherein
   the recording unit records the number of detections of the data transfer error per the unit time and the operating status of the device such that the number of detections of the data transfer error per the unit time and the operating status are temporally associated, and
   the identification unit temporally associates and displays the number of detections of the data transfer error per the unit time and the operating status if the cause of occurrence of the data transfer error is judged to be influence of noise.

5. The information processing apparatus according to claim 1, comprising:
   a machine learning device that learns the cause of occurrence of the data transfer error corresponding to the number of detections of the data transfer error per the unit time, instead of the identification unit, wherein
   the machine learning device includes
      a state observation unit that observes the number of detections of the data transfer error per the unit time as a state variable representing a current state of an environment,
      a judgment data acquisition unit that acquires judgment data indicating the cause of occurrence of the data transfer error, and
      a learning unit that learns by associating the number of detections of the data transfer error per the unit time and the cause of occurrence of the data transfer error using the state variable and the judgment data.

6. A machine learning device for learning a cause of occurrence of a data transfer error corresponding to the number of detections of the data transfer error per unit time in data communication with a device, the machine learning device comprising:
   a state observation unit that observes the number of detections of the data transfer error per the unit time as a state variable representing a current state of an environment;
   a judgment data acquisition unit that acquires judgment data indicating the cause of occurrence of the data transfer error; and
   a learning unit that learns by associating the number of detections of the data transfer error per the unit time and the cause of occurrence of the data transfer error using the state variable and the judgment data.

7. A system having a plurality of apparatuses interconnected over a network, wherein
the plurality of apparatuses include at least the information processing apparatus according to claim 5.

8. The system according to claim 7, wherein
the plurality of apparatuses include a computer that is provided with a machine learning device,
the computer acquires at least one trained model that is generated through learning in the learning unit of the information processing apparatus, and
the machine learning device provided in the computer performs optimization or streamlining based on the acquired trained model.

9. The system according to claim 7, wherein
the plurality of apparatuses include a different information processing apparatus that is distinct from the information processing apparatus, and a result of learning by the learning unit provided in the information processing apparatus is shared with the different information processing apparatus.

10. The system according to claim 7, wherein
the plurality of apparatuses include a different information processing apparatus that is distinct from the information processing apparatus, and
data observed by the different information processing apparatus is available for learning by the learning unit provided in the information processing apparatus over the network.

* * * * *